United States Patent [19]

Kramhöller et al.

[11] 4,361,829

[45] Nov. 30, 1982

[54] DEVICE FOR THE TURN INDICATOR BLINKER LIGHTS OF A MOTOR VEHICLE, ESPECIALLY OF A MOTORCYCLE

[75] Inventors: Richard Kramhöller, Munich; Hartwig Lobe; Wolfgang Meyer, both of Unterschleissheim, all of Fed. Rep. of Germany

[73] Assignee: Bayerische Motoren Werke AG, Munich, Fed. Rep. of Germany

[21] Appl. No.: 29,011

[22] Filed: Apr. 11, 1979

[30] Foreign Application Priority Data

Apr. 12, 1978 [DE] Fed. Rep. of Germany ....... 2815784

[51] Int. Cl.³ .............................. B62J 3/00; B60Q 1/34
[52] U.S. Cl. .................. 340/134; 340/52 D; 340/55; 340/56; 340/73; 340/407; 200/61.37; 200/61.91; 116/DIG. 17
[58] Field of Search ............... 340/134, 52 D, 55, 56, 340/73, 74, 75, 377, 407, 573, 570; 200/61.27, 61.28, 61.37, 61.85, 61.88, 61.91; 116/DIG. 17, 35 R, 35 A

[56] References Cited

U.S. PATENT DOCUMENTS

| 2,191,516 | 2/1940 | Caldwell | 340/407 |
| 2,258,747 | 10/1941 | Doane | 340/407 |
| 2,566,409 | 9/1951 | Greene | 340/407 |
| 2,682,042 | 6/1954 | Harcum | 340/407 |
| 2,790,157 | 4/1957 | Guest et al. | 340/134 |
| 3,009,142 | 11/1961 | Stergerwald | 340/407 |
| 3,876,976 | 4/1975 | Cross | 340/134 |
| 3,931,529 | 1/1976 | Williamson | 340/134 |
| 3,991,399 | 11/1976 | Jager | 340/52 R |
| 4,125,827 | 11/1978 | Roudebush | 340/134 |
| 4,241,328 | 12/1980 | Lobe et al. | 340/75 |

Primary Examiner—John W. Caldwell, Sr.
Assistant Examiner—Donnie L. Crosland
Attorney, Agent, or Firm—Craig and Antonelli

[57] ABSTRACT

A device for indicating engagement or operable condition of turn indicator blinker lights of a vehicle, wherein the vehicle is provided with a gripping member adapted to be contacted by the driver of a vehicle, such as a grip of a handlebar of a motorcycle. A kinetic signal generator is response to the operation or engagement of the turn indicator blinker lights for generating kinetic signal on the gripping member as an indication of operation of the blinker lights.

10 Claims, 2 Drawing Figures

DEVICE FOR THE TURN INDICATOR BLINKER LIGHTS OF A MOTOR VEHICLE, ESPECIALLY OF A MOTORCYCLE

The present invention relates to a device for monitoring or indicating the engagement or operative condition of turn indicator blinker lights of a motor vehicle, especially a motorcycle.

Figure 1:
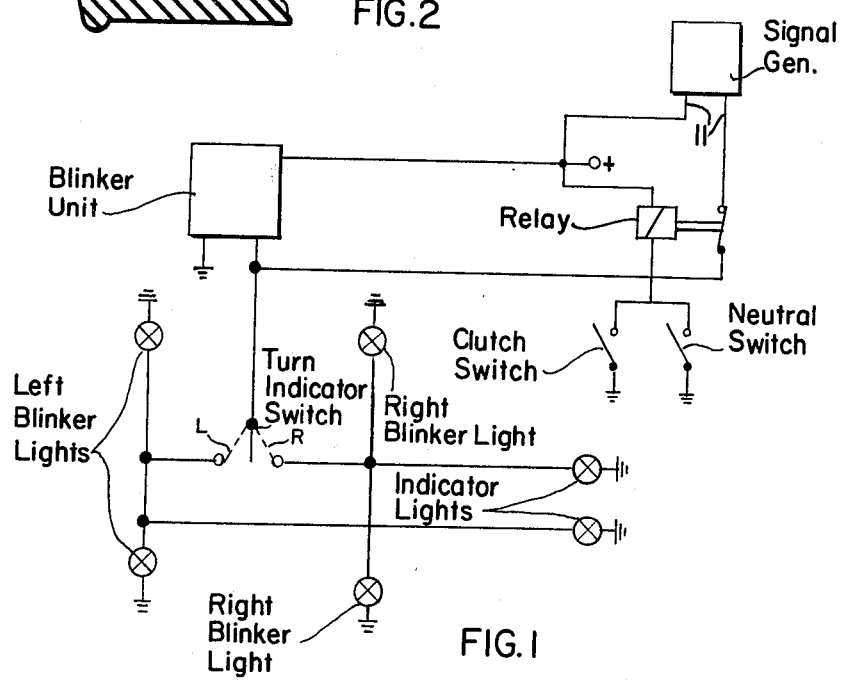

A circuit arrangement for the turn indicator blinker lights of a motor vehicle such as a motorcycle is disclosed in co-pending application Ser. No. 864,433, now abandoned, and as illustrated in FIG. 1 filed Dec. 27, 1977, wherein provision is made for minimizing the effect of turn indicator blinker light controls on the environment. That is, it is common practice to utilize a signal generator such as a buzzer, to indicate engagement or operative condition of turn indicator blinker lights, especially for such lights of a motorcycle. However, such audible signals, which are operable during operation of the turn indicator blinker lights including during standstill or stoppage of the motorcycle, for example, at an intersection, represent an unnecessary and annoying noise disturbance both for the driver, as well as for other traffic participants and pedestrians who are in proximity thereto. Accordingly, the co-pending application provides a circuit arrangement in which a superfluous operation of the acoustic signal device which is annoying to bystanders is avoided by disengaging or turning off the acoustic signal device when the motor vehicle stands still, as with an interrupted force-transmission of the motor vehicle i.e., when the transmission power of the motor vehicle is interrupted. In this manner, the signal device is then turned on only when it is meaningful and necessary, namely, during the drive operation for reminding the driver of the engaged blinker lights.

While the co-pending application, enables a minimization of the effect of the blinker light monitoring or signaling device on the environment, such device still provides acoustic signals of an annoying nature during the drive of the motor vehicle.

It is therefore an object of the present invention to overcome the disadvantages of the prior art arrangements regarding the effects on the environment of signalling or monitoring device for the turn indicator blinker lights of a motor vehicle.

It is another object of the present invention to completely avoid the acoustic effects on the environment of a signal or indicator device of the turn indicator blinker lights of a motorcycle.

In accordance with the present invention, there is provided a signal or monitoring device for indicating the the engagement or operative condition of turn indicator blinker lights of a motor vehicle, which is associated with a member normally gripped by a driver of the vehicle such as a handlebar grip of a motorcycle and which produces a kinetic signal on the grip member in accordance with the operative condition or engagement of the turn indicator blinker lights. The kinetic signal is not observable in the environment and is non-acoustic while at the same time providing reliable information to the driver or cyclist as to the switched-on blinker lights.

In accordance with a feature of the present invention, there is provided an immediate local connection between the turn indicator blinker switch and the signal device so as to provide a signal which affects the handlebar grip in the vicinity of the blinker switch. Further, the kinetic signal effects a movement of the handlebar grip in the longitudinally direction of the handlebar.

According to another feature of the present invention, the signal device includes a magnetic coil assembly associated with the handlebar grip which assembly includes a return spring whereby the handlebar grip is moved under the effect of the magnetic coil which is variably or alternately energized and the return spring. Further, the present invention provides that the magnetic coil is disposed within the handlebar of the motorcycle and effects movement of a longitudinally movable soft iron core which is fixedly connected with the handlebar grip.

Figure 2:
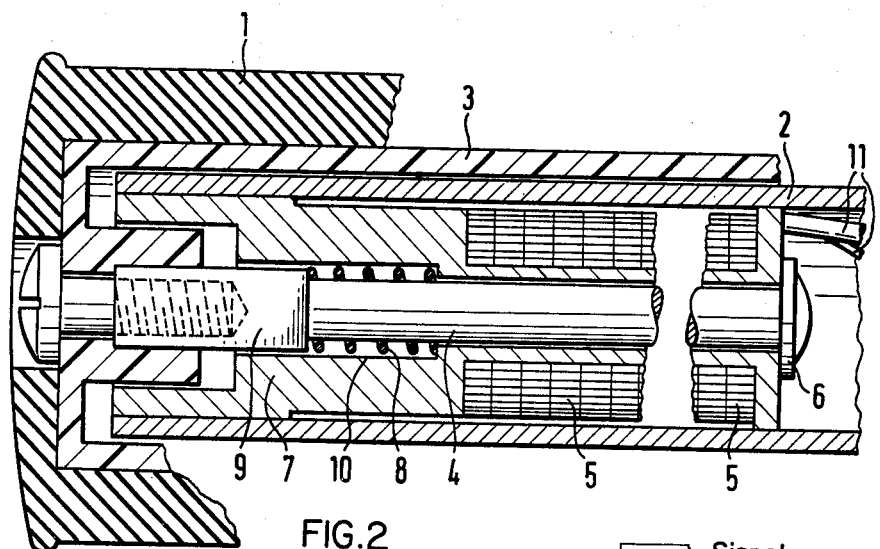

These and further objects, features and advantages of the present invention will become more obvious from the following description when taken in connection with the accompanying drawing, wherein:

FIG. 1 is a schematic illustration of a circuit arrangement in accordance with the copending application; and FIG. 2 is a partial cross-sectional view of a handlebar and grip with the signalling device of the present invention.

Referring now to FIG. 2 of the drawing, there is illustrated in partial sectional view, a handlebar 2 of a motorcycle or a like gripping member of a motor vehicle and a tubular guide 3, made of plastic, for example, on which is seated a handlebar grip 1. The tubular guide 3 is secured to a soft iron core member or armature 4 by means of a fastening screw or like member. The soft iron core member or armature 4 includes a cylindrical portion and the armature is movable with respect to a magnetic coil 5 provided on a support member 7.

The soft iron core member or armature 4 is provided with an abutment or stop member 6 for abutting against one end of the support member 7 for limiting the movement of the armature and therewith the handle bar grip 1 in one direction. As is illustrated, a spring 8 in the form of a compression spring biases the armature 4 outwardly so that the abutment member 6 contacts the end of the support 7. The spring 8 is mounted in a recess of the support member 7 which recess is preferably rectangular in cross section and into which a corresponding rectangular extension 9 of the armature 4 is guided so as to provide for handle grip turning security.

The magnetic coil 5 is pulsatingly energized via two connecting leads 11 in response to the switching on of the turning indicator blinker lights by means of a blinker light or turn indicator switch as illustrated in FIG. 1 and which may be disposed in the vicinity of the grip 1 and the motorcycle transmission being engaged. That is, in the case where the clutch is engaged and a gear is applied. For such an arrangement, two switches as shown in FIG. 1 are provided in the leads 11, which switches are connected with the clutch or the gear and are closed or opened in dependence upon the circuit construction when the clutch is engaged or the gear is applied and for which switches are opened or closed when the clutch is disengaged or the gear is on idling or neutral so as to appropriately control the contact of the relay. Thus, a signalling or indicating arrangement is provided which is inoperative during the standstill of the motorcycle with an interrupted force or power-transmission of the motorcycle.

When the magnetic coil is energized with a pulsed current, e.g., in the rhythm of the blinker lights, the magnetic coil 5 exerts a variable pulling force on the soft iron core armature 4 so that the armature and the grip 1 connected therewith are moved co-axially with respect to the handlebar 2. In the absence of the pulsed current, the armature and grip are returned to the rest position under the action of the spring 8 as delimited by the abutment member 6. In this manner, the cyclist or driver thereby receives an indication that the blinker lights are operative with an engaged transmission, without any effect on the environment.

As is apparent, by eliminating the above-noted switches in the connecting leads 11, which are connected with the clutch or gear, the signalling device will be activated in response to the operation of the blinker light switch and operation of such lights even when the transmission is disengaged. Additionally, although only one signalling or monitoring device has been illustrated, it is apparent that one or two such devices may be utilized in the handlebar arrangement, wherein two such devices may provide indications of operation of right and left turning indicator blinker lights, respectively.

It is understood that the present invention is not limited to the details shown and described herein but is susceptible to numerous changes and modifications as known to those skilled in the art such that the present invention is intended to cover all such changes and modifications as are encompassed by the scope of the appended claims.

We claim:

1. A device for indicating operation of the turn indicator blinker lights of a motorcycle having a handlebar comprising at least one gripping means adapted to be gripped by an operator of the motorcycle, the at least one gripping means being a grip for the handlebar mounted on the handlebar so as to at least partially surround an outer surface of an end portion of the handlebar and extend in the longitudinal direction of the handlebar, kinetic signal generating means responsive to the operation of the turn indicator blinker lights for generating a kinetic signal in the at least one gripping means, and means for coupling the handlebar grip to the kinetic signal generating means so as to move the handlebar grip with respect to the handlebar in the longitudinal direction of the handlebar in response to the signal generated by the kinetic signal generating means.

2. A device according to claim 1, further comprising a turn indicator switch on the motorcycle for switching on the turn indicator blinker lights and enabling operation of the kinetic signal generating means.

3. A device according to claim 1, wherein the means for coupling the kinetic signal generating means to the handlebar grip includes a tubular sleeve at least partially surrounding an end portion of the handlebar and having the handlebar grip mounted thereon, the handlebar grip and tubular sleeve member being movable together with respect to the handlebar in opposite directions in the longitudinal direction of the handlebar in sequence with the blinking of the turn indicator blinker lights.

4. A device according to claim 3, wherein the tubular sleeve is interposed between an interior surface of the handlebar grip and the outer surface of the handlebar.

5. A device according to any one of claims 2 or 3 wherein the kinetic signal generating means includes an electromagnetic assembly.

6. A device according to claim 5, wherein the electromagnetic assembly includes magnetic coil means responsive to operation of the turn indicator blinker lights for being pulsatingly energized, an armature movable in one direction with respect to the magnetic coil means in accordance with energization of the magnetic coil means and spring means for moving the armature in an opposite direction when the magnetic coil means is de-energized.

7. A device according to claim 6, wherein the magnetic coil means is disposed in the handlebar and the armature is a longitudinally movable soft iron core member fixedly connected with the handlebar grip.

8. A device according to claim 7, wherein the kinetic signal generating means is further responsive to the transmission power of the motorcycle being interrupted for being rendered inoperative during the transmission power interruption.

9. A device according to claim 7, wherein gripping means are provided at respective opposite ends of the handlebar, the kinetic signal generating means generating a signal to the respective gripping means in accordance with operation of the right or left blinker light.

10. A device according to claim 7, wherein the kinetic signal generating means generates a non-acoustic signal.

* * * * *